No. 699,465. Patented May 6, 1902.
J. M. HEARNDON.
ANIMAL TRAP.
(Application filed Sept. 7, 1901.)
(No Model.)

Inventor
James M. Hearndon,

Witnesses

Attorneys

UNITED STATES PATENT OFFICE.

JAMES MADISON HEARNDON, OF MICCO, FLORIDA.

ANIMAL-TRAP.

SPECIFICATION forming part of Letters Patent No. 699,465, dated May 6, 1902.

Application filed September 7, 1901. Serial No. 74,677. (No model.)

*To all whom it may concern:*

Be it known that I, JAMES MADISON HEARNDON, a citizen of the United States, residing at Micco, in the county of Brevard and State of Florida, have invented a new and useful Animal-Trap, of which the following is a specification.

My invention is an improved animal-trap constructed principally with the view of capturing the otter and similar animals; and the object of my improvement is to provide a simple and inexpensive trap whereby the capture and destruction of the animal shall be complete.

As is well known to those skilled in the art of trapping otter, it is absolutely necessary to conceal the trap, which is often done with leaves, twigs, and the like, and as the traps now commonly used are often rendered inoperative by the use of such material it is the purpose of my invention to avoid this objection, and this I do by arranging a pair of spring-operated arms so arranged that when they are released they will fold up and grasp the animal by the head or body and hold it until life is extinct.

A further object of my improvement is to provide a self-locking trap that will positively hold the animal against any movement caused by its efforts to be released; and with these objects in view my invention consists in the peculiar construction and novel combination and arrangement of parts, as will be fully described in the following specification and pointed out in the claims, reference being had to the accompanying drawings, in which—

Figure 1:
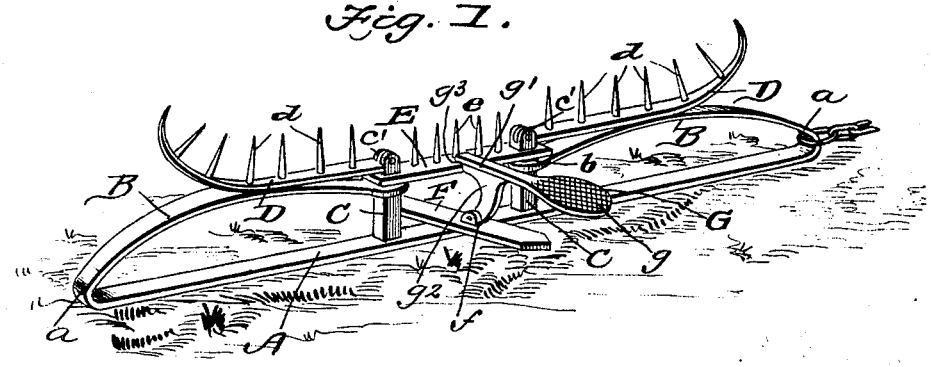
Figure 2:
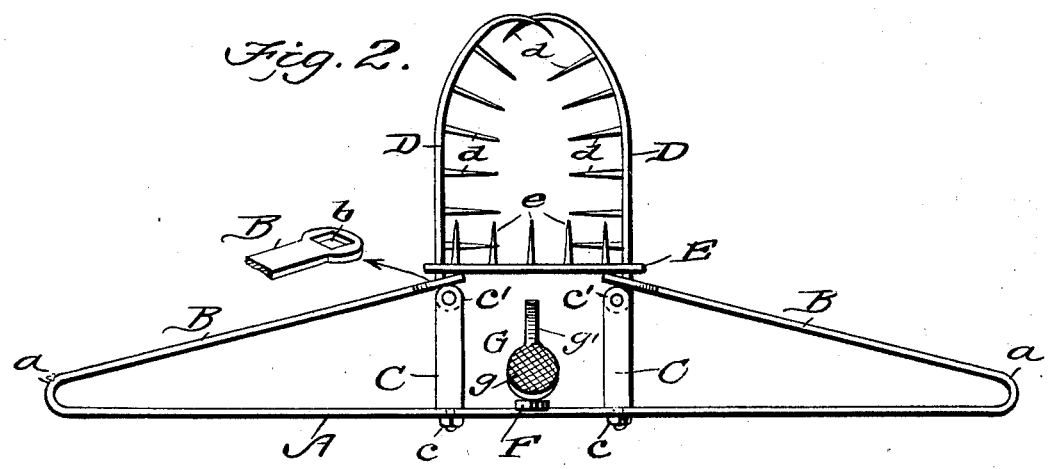
Figure 3:
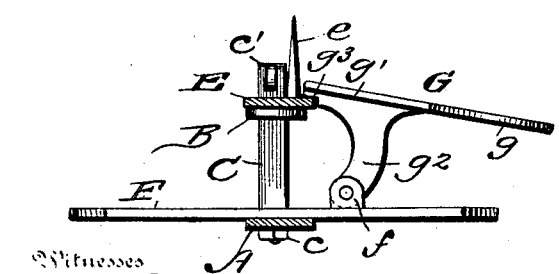
Figure 4:
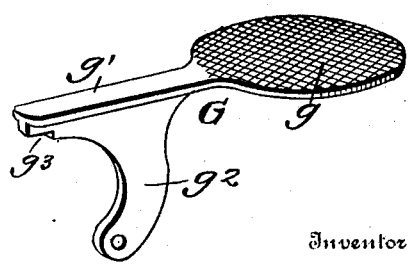

Figure 1 is a perspective view of my improved trap, the view illustrating the trap as open or set. Fig. 2 is an enlarged side view of the trap closed. Fig. 3 is an enlarged central transverse section of the trap in the same position shown in Fig. 1, and Fig. 4 is a detail view of the pawl or trigger.

In constructing a trap in accordance with my invention I employ a base-bar A, having its ends bent over at $a$ to form spring-arms B, the said arms having their extreme ends provided with non-circular apertures $b$, through which is designed to pass posts C, that protrude from the base A. These posts are preferably made square in cross-section, with their lower ends terminating in short threaded sections which are designed to pass through apertures in the base-bar and held in position thereon by nuts $c\ c$. The upper end of the posts are formed into apertured ears $c'\ c'$, between which is pivotally held a pair of jaws D, having inwardly-projecting sharpened teeth or spurs $d\ d$. The outer ends of the jaws are curved or bent inwardly, as shown, so that their extreme ends cross and project downwardly, and in practice these ends are pointed, so as to make additional spurs. A cross-bar E is slidably held on the posts and is provided upon its upper surface with spurs $e$. This bar is designed to rest upon and be operated by the spring-arms B, and in order to provide a latch for holding the bar down against the tension of the springs I pivotally secure upon a cross-bar F the trigger or releasing device G, which is formed of a main tread portion $g$, having an extension $g'$ protruding therefrom, and from the under side of the extension depends an arm $g^2$, by which the trigger or latch is held to the cross-bar F, being pivoted thereto between ears $f$, arranged on the said bar. The forward end of the extension is provided with a notch $g^3$, that is designed to fit over the edge of the cross-bar E and hold it in position.

In operation when the trap is set, as shown in Fig. 1, the spring-arms are depressed, which allows the cross-bar to drop down over the posts, the jaws dropping down until they rest upon the spring-arms. The trigger is then brought into engagement with the cross-bar, which holds the parts in the position shown, and by reason of having the pivotal point arranged to one side of the edge of the bar and back under the trigger a very sensitive latch is obtained, which releases its hold upon the slightest movement.

After the parts have been set as described if the trigger be given a slight downward pressure it would release the bar, which by the action of the springs would be forced upwardly, causing the jaws to attain such position, when the bar will slip over them and be clamped, as shown in Fig. 2.

Now it will be observed that by arranging the spring-arms to operate as described they will naturally receive an outward movement, the point $a$ acting as a center upon which the arms swing, and after they pass the tops of the posts C the jaws being of a less width than the posts permits of this outward movement, but prevents any downward movement of the jaws or bar, as the spring will rest directly on top of the posts, and thereby form a lock against any displacement.

It will thus be seen that I provide a very simple, complete, and inexpensive trap for the purpose described.

Having thus fully described my invention, what I claim as new, and desire to secure by Letters Patent, is—

1. In a device of the kind described, the combination of a base-bar having its ends terminating in spring-arms, posts arranged on the said base-bar and adapted to pass through apertures formed in the said arms, jaws pivotally held on the said posts, a cross-bar arranged to operate upon the said jaws, and means for holding the said jaws in an open position, substantially as shown and described.

2. In a device of the kind described, the combination of a base-bar having its end terminating in spring-arms, posts arranged on the said base, jaws pivotally held in the said posts, a cross-bar having perforations formed in the ends thereof and adapted to slide upon the said posts and operate through the medium of the spring-arms, to close the said jaws, and means for locking the said jaws in an open or closed position, substantially as shown and described.

3. In a device of the kind described, the combination of a base having spring-arms formed thereon, posts held on the said base-bar, jaws provided with spurs pivoted in the posts, a cross-bar having spurs and arranged to operate to close the said jaws through the medium of the said spring-arms, and a trigger arranged for engagement with the said cross-bar for holding the trap in an open or set position, substantially as shown and described.

4. In a device of the kind described, the combination of a base-bar, having spring-arms formed thereon, posts arranged on the said base-bar and adapted to pass through apertures formed in the ends of the said spring-arms, jaws pivoted in the said posts, a cross-bar having its ends provided with apertures through which the said posts are adapted to pass when the said bar is pressed down against the tension of the spring-arms, and adapted to operate upon the jaws when the springs are released, a trigger pivotally held on a transverse bar arranged on the base and adapted for locking the said cross-bar against the tension of the spring-arms, the said springs being adapted to rest against the upper ends of the posts when released from engagement with the trigger, thereby locking the jaws in a closed position, the said jaws and bar having spurs arranged thereon, substantially as shown and described.

JAMES MADISON HEARNDON.

Witnesses:
JESSE F. HERNDON,
J. T. BEVILLE.